Inventor:
Oscar O. Nygaard,
by James R. Hodder
Attorney.

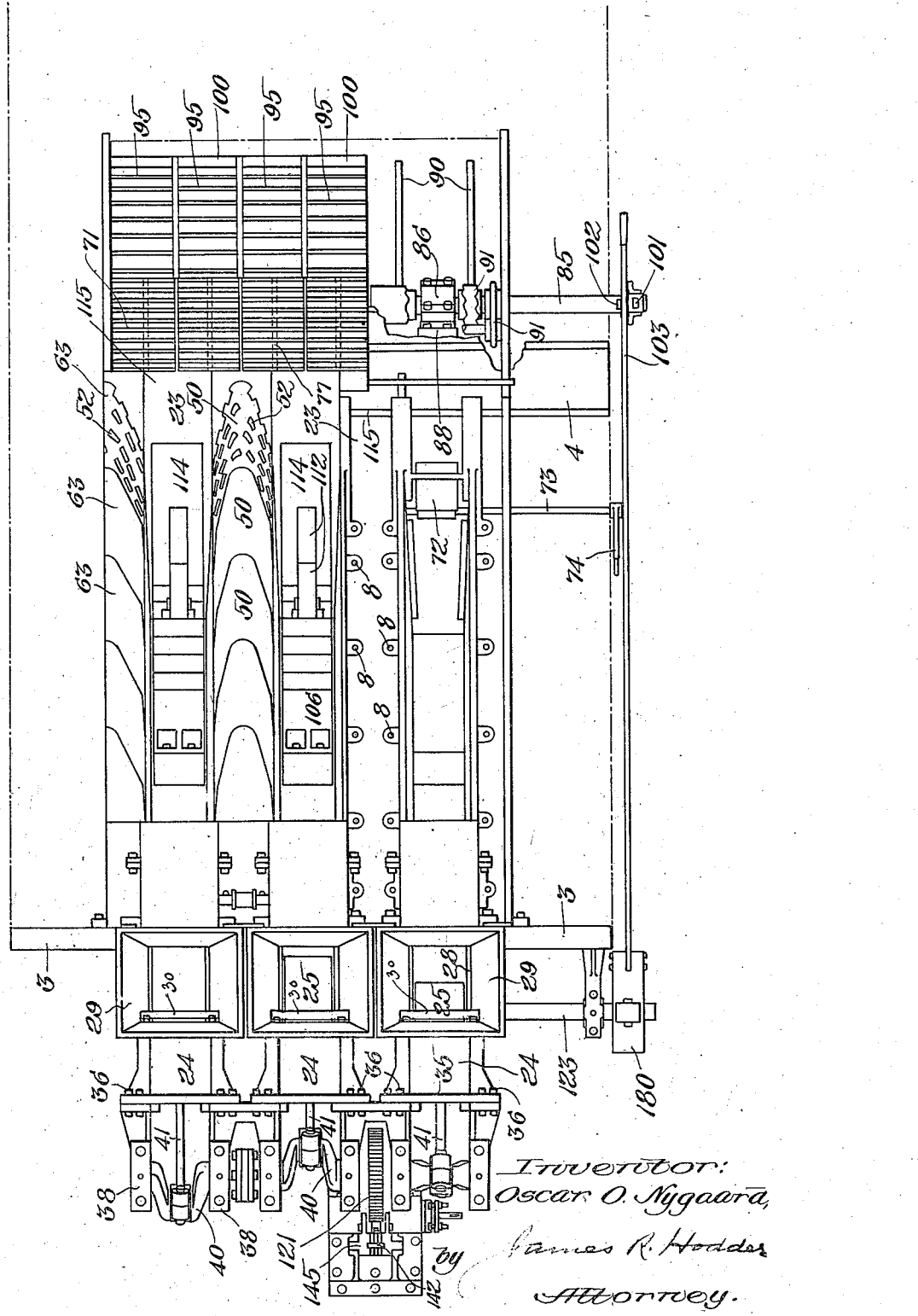

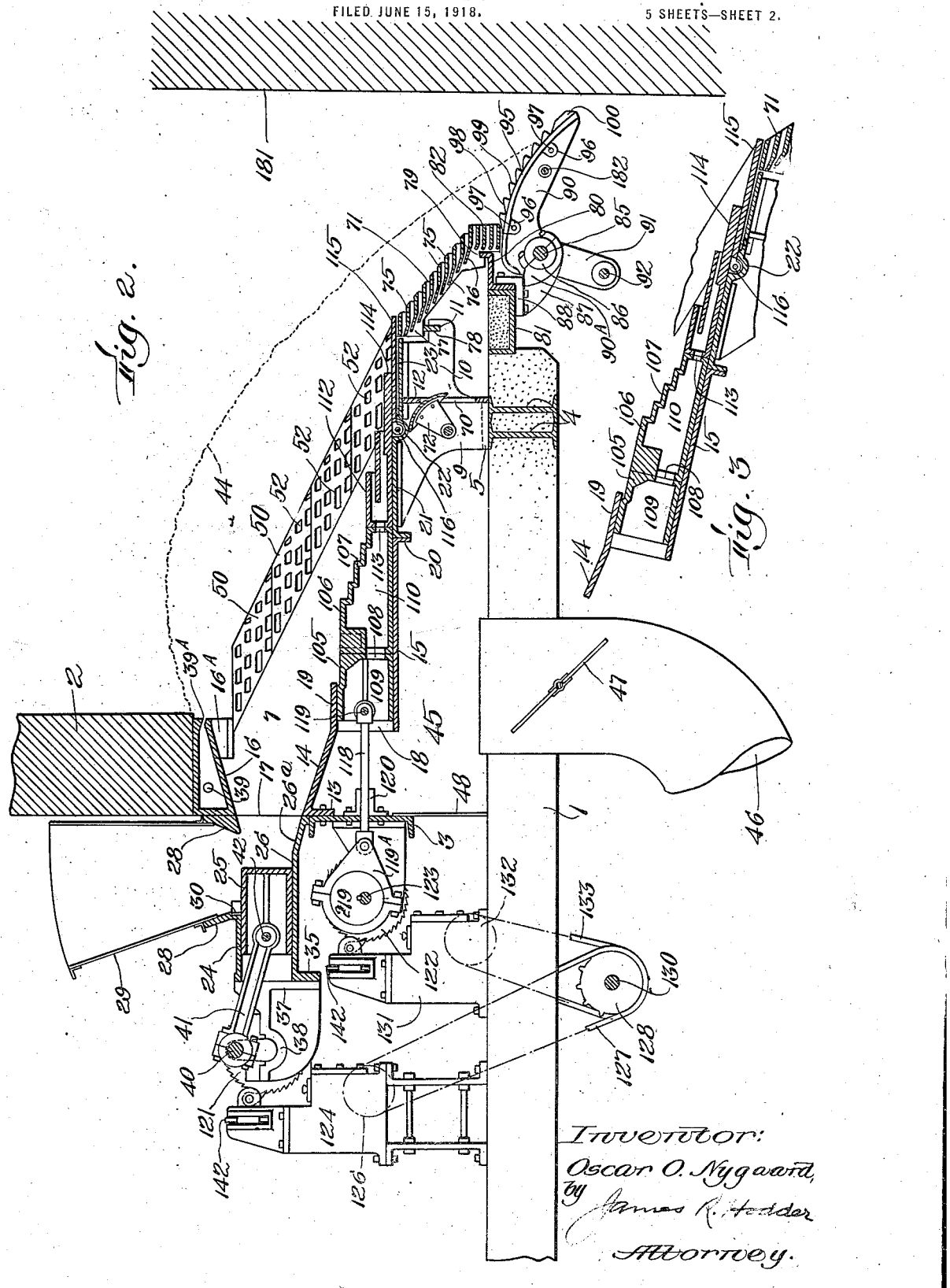

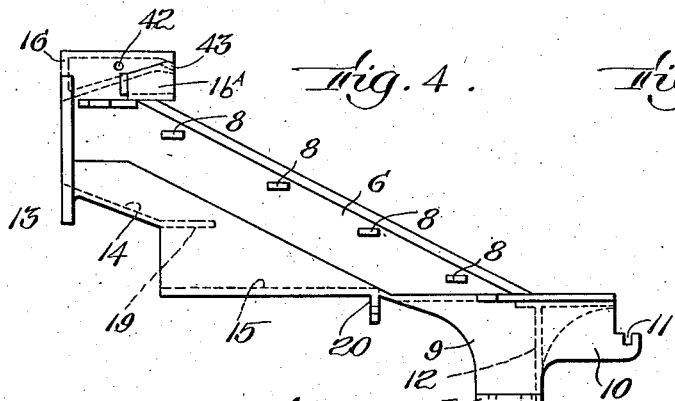
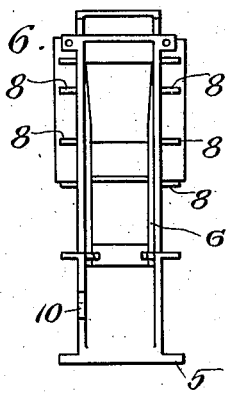
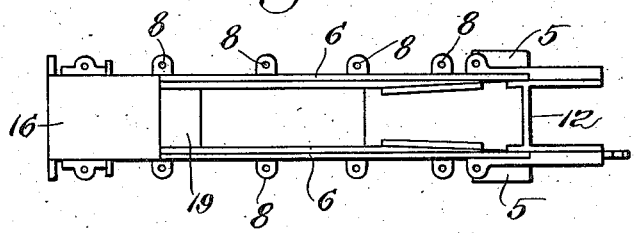
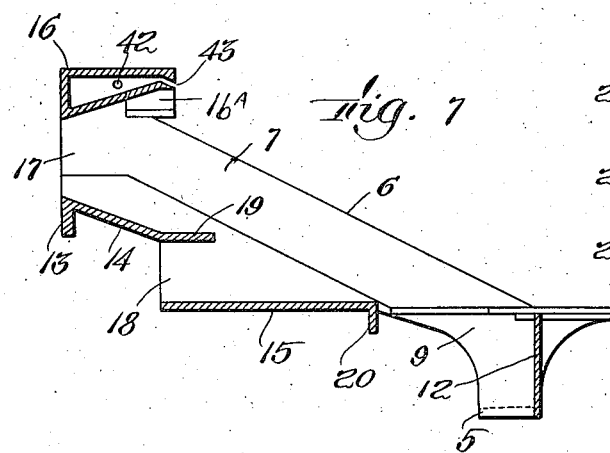
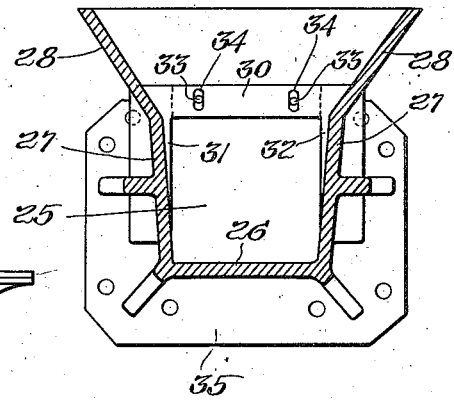

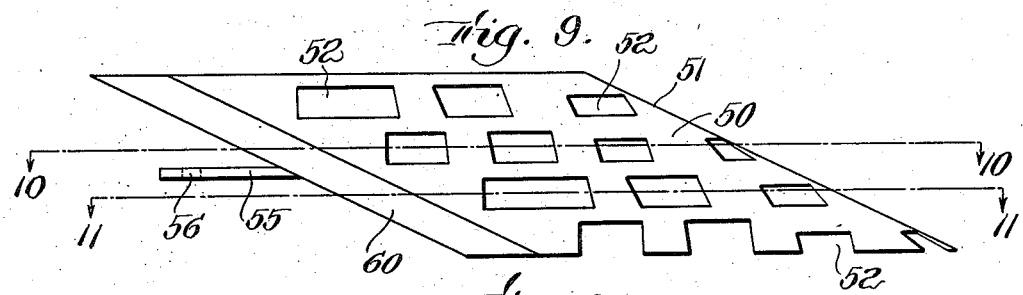
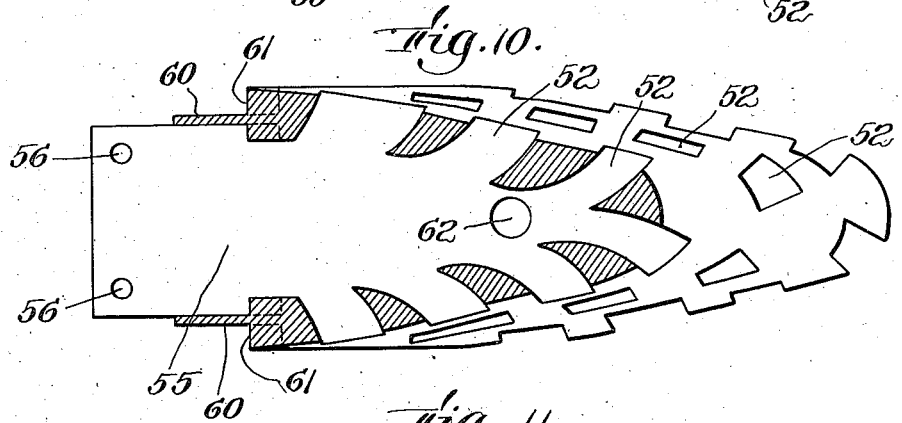
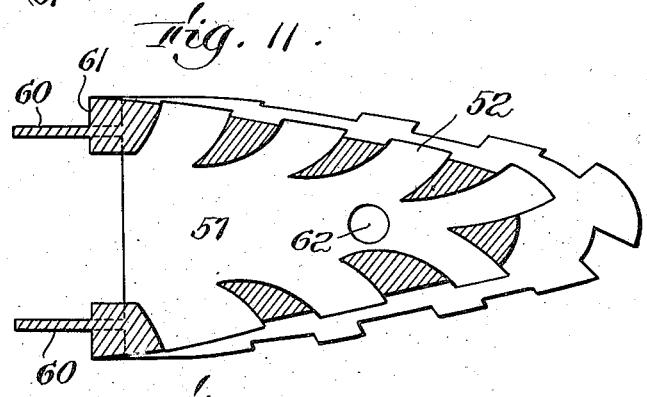
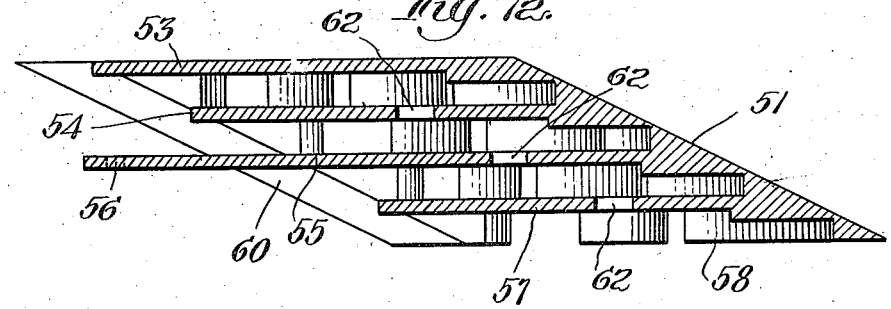

Patented Jan. 9, 1923.

1,441,293

UNITED STATES PATENT OFFICE.

OSCAR O. NYGAARD, OF MATTAPAN, MASSACHUSETTS.

AUTOMATIC STOKER.

Application filed June 15, 1918. Serial No. 240,160.

*To all whom it may concern:*

Be it known that I, OSCAR O. NYGAARD, a citizen of the United States, and resident of Mattapan, in the county of Suffolk and State of Massachusetts, have invented an Improvement in Automatic Stokers, of which the following description, in connection with the accompanying drawings, is a specification, like letters on the drawings representing like parts.

My present invention is an automatic stoker designed particularly for use in connection with stoking mechanism of the underfeed type, but certain features are not thus limited, but are of more general usefulness. My invention contemplates novel and improved means for securing an effective actuating mechanism; means to enable adjustments of various kinds in the driving devices, simplicity of construction, ease and facility in assembling, and renewing broken or worn parts and also improved arrangements to eliminate the wearing or burning out of parts of the stoker mechanism.

One of the important features of my present invention consists in the provision of devices which will enable the automatic coal feeding, the clinker removing, and grate dumping devices, in the stoker, to be actuated either together, independently, at variable speeds, or singly as desired. This feature is of very great importance, as I provide a considerable range between the devices feeding in the fresh coal and the subsequent clinker removing and grate dumping mechanisms, thus permitting the stoker to be quickly and instantly adjusted for the most efficient operating action of all these parts for the particular grade of coal and work to be done. In carrying out this feature I arrange independently actuated driving connections for the upper fuel feeding rams or pushers, and for lower fuel feeding and clinker moving rams, as well as for the grate actuating and dumping devices, preferably operating the clinker ram and grate dumping mechanism from the same power drive in timed relation.

An additional novel feature consists in the construction, form and operation of the tuyères, preferably forming the same as box like members, having an area and size equal to a plurality of ordinary tuyère sections. These box-like grates or tuyères of my invention also have a plurality of curved air openings preferably peculiarly arranged to eliminate the danger of breaking or cracking of each section, with the openings therethrough staggered or disalined, and I provide a relatively long burning surface, so that even should the outer portion of the tuyère box be consumed and burned out, no harm will result to the rest of the stoker mechanism.

A further important feature consists in the novel arrangement to maintain certain portions of the stoker mechanism cool to preserve the same against damage, injury or being burned out, and to utilize these cooling and preserving means as a conduit supplying air to those parts of the stoker which will need special air supply for additional consumption. It will be appreciated that in automatic stokers of the type herein illustrated, a considerable supply of forced draft under pressure is led into the stoker mechanism and I provide a specially beneficial and novel arrangement for conducting such forced draft in a uniform manner throughout the stoker, throughout each set or tier of tuyère boxes, and through those portions of the mechanism which it is especially desirable to keep cool and preserve against rapid burning out. In this connection also, I provide easily removable and repairable sections of the apparatus which are subject to the greatest wear, and quickest destruction, so as to enable such parts to be quickly, readily and easily replaced without dismantling the adjacent portions of the stoker mechanism.

A specially valuable and novel part of my invention consists in the arrangement of the dumping grates and the means for automatically actuating same. These dumping bars are preferably so positioned, so formed, and so actuated as to effect a constant dumping and rearwardly feeding action on the consumed portions of the fuel, regulated at a speed in proper timed relation with the consumption of the fuel and the actuation of the clinker moving ram. These dumping bars include means to effect a cam like or eccentric feeding and dumping action under adjustable and automatic control, together with peculiarly formed corrugations in the surfaces of the grate bars to facilitate this feeding of the ashes during dumping. A novel means for counterbalancing these dump bars simplifies their operation in a minimum of power. A still further function of my novel type of dump bars is to maintain the bridge wall free of clinkers, crushing and removing any clinkers formed thereon at the dumping end of the stoker.

In order to simplify construction, and render the entire apparatus more efficient, I find it desirable to make the rams or pushers of novel form, which will largely if not entirely eliminates the "siftings" which are thrown out on the backward stroke of the rams, necessitating attendance to clean up and remove the same. By forming the rams and operating parts substantially square and providing adjustable guiding or scraping plates to hold the squared rams in position, and close the openings around the top and sides, I have succeeded in securing a more efficient ram than any of which I am at present informed and one capable of long wearability and usefulness, but also eliminating to a large degree the danger from siftings.

Additional important features consist in the form and arrangement of the overfeed grate bars, accessibility of all parts, interchangeability of similar portions, novel design, function and operation of the driving devices, shearing pin means, control of air supply, and other details of construction, novel combinations of parts and advantages, which will be hereinafter more fully pointed out and claimed.

Referring to the drawings, illustrated preferred embodiments of my invention,

Fig. 1 is a plan view of an automatic underfeed stoker embodying my invention, showing a part of the overfeed grates and dumping grates removed and with the tuyère boxes and feeding pusher omitted from a retort for clearness;

Fig. 2 is a cross sectional view through one of the retorts;

Fig. 3 being a fragmentary cross-sectional view illustrating a modification to secure additional advantages obtained by an inclined retort trough for additional gravity feed.

Fig. 4 is a longitudinal side view of the frame forming the side of a trough or retort;

Fig. 5 being a plan view; and

Figure 13:
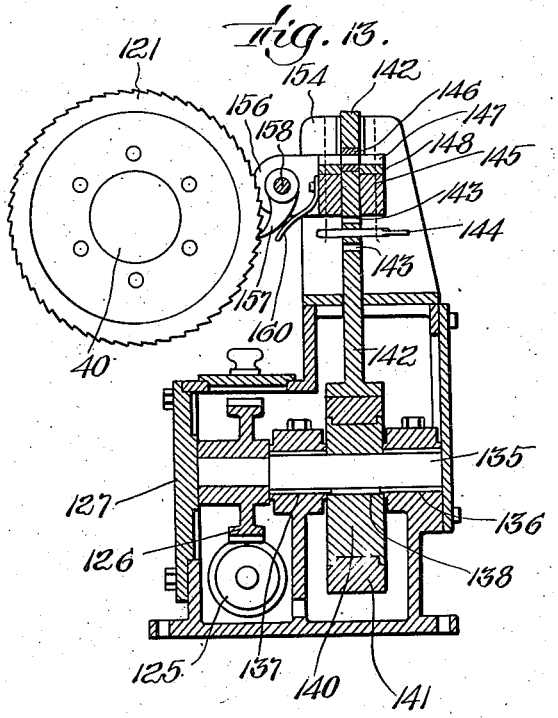
Figure 14:
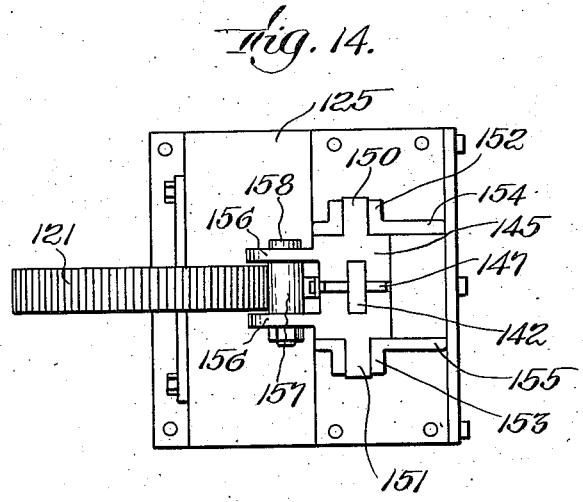

Fig. 6 an end view of the same;

Fig. 7 being a cross-sectional longitudinal view of the frame shown in Fig. 4;

Fig. 8 is an enlarged cross-sectional view of the hopper and bearing for the feed pusher;

Fig. 9 is a side view of the tuyère box;

Fig. 10 being a horizontal cross-sectional view on the line 10—10 of Fig. 9;

Fig. 11 being a horizontal cross-sectional view of the tuyèrs box on the line 11—11 of Fig. 9;

Fig. 12 is a longitudinal cross-sectional view through the tuyère box;

Fig. 13 is a side view, partly in cross-section, of the driving mechanism and shearing pin construction;

Fig. 14 being a plan view; and

Figure 15:
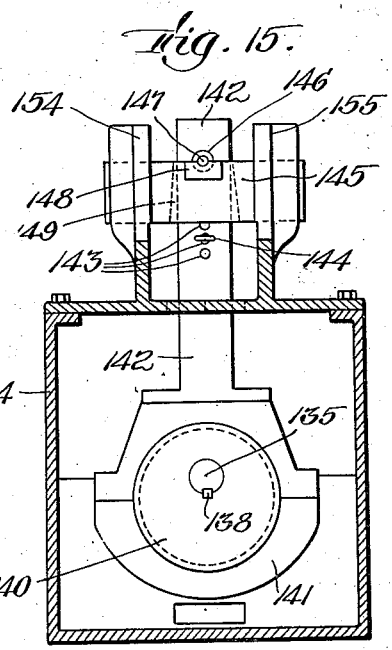
Figure 16:
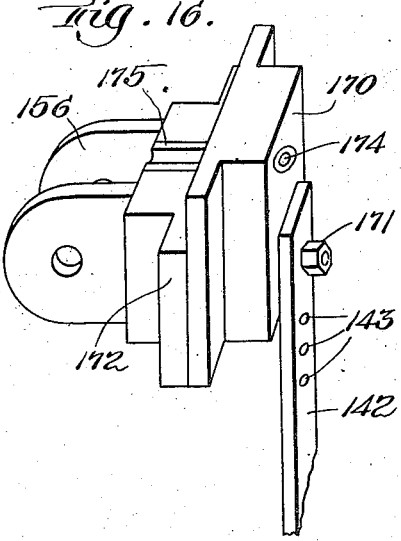

Fig. 15 an end view of the same;

While Fig. 16 is a view in perspective illustrating a modification of the driving connection.

It will be understood that my novel type of stoker may be of suitable size, both in length and breadth, for any work to which it is to be put, and that as many retorts may be arranged side by side to constitute a stoker of as great an area as may be desired.

Certain features of my invention, also, may be utilized independently of each other, for example, the driving mechanism and shearing pin may be applied to the driving device for other types of automatic underfeed stoker mechanisms; the tuyère boxes may be advantageously employed in connection with different feeding and the like mechanism in other designs of stokers; and, the arrangement of overfeed grate bars, dumping grates, and the automatic actuating means therefore, may be employed with different makes of retorts, feeding devices and tuyères. The present application and attached drawings illustrate my several novel features assembled in the preferred form, and are thus shown for illustrative purposes only, and not as limiting the broadly novel features to the particular combinations as shown assembled in the drawings.

As illustrated in Figs. 1 and 2 showing my stoker as a working unit comprising three retorts; the floor or foundation 1, preferably of concrete and front wall 2, usually of brick, are designated in conventional form, the cross beam 3 spanning the opening for the stoker mechanism under the portion of the front wall 2 constitutes the main front support for the stoker mechanism, extending transversely of the retorts, a rear transverse support consists in a pair of I-beams 4 imbedded in the concrete 1, on which rests a flange or foot 5 of the inner end of the sides 6, 6, forming each retort. These sides are preferably of cast iron, with a slight upward flare, to prevent the coal sticking during coking, and forming the trough or retort 7 to receive the coal supply and having on the outer side a plurality of lugs 8, 8; on which the tuyère boxes rest. Each side has a depending web 9 on which the flange 5 is carried at the bottom, and a rearwardly extending bracket 10, having therein a recess 11 to support the overfeed grates, as will be described, a vertical brace or web 12 holding each pair of sides 6 in a retort together at the rearward or grate end, while the relatively heavy U-shaped flange 13 at the front end, which is bolted to the I-beam 3, supports the front of each retort. Preferably the sides 6, webs 9, 10, 12, flange 13 and trough bottoms 14 and 15, and cap or cover 16, are all formed as a single casting, providing openings 17 for the fuel feed ram at the top of each retort opening into the trough 7, and a corresponding opening 18 for the clinker pusher, these openings being preferably square to receive squared pistons, rams or pushers therein as will be explained, the upper portion 14 being extended over the opening 18 as shown at 19 to provide a bearing for said second pusher. Across the rear portion of the bottom 15 is a flange 20, to which is bolted an extension 21 of the bottom of the trough 7, which extension has a circular recess 22, and a further part 23 constituting a cover or top across the brackets 10 hinged at the recesses 22. At the front or receiving end of each retort, is affixed a coal hopper 24 having a bearing for the fuel feeding ram 25, said hopper having its floor 26 inclined at the forward portion as shown at 26ª, resting on the top of the I-beam 3 and constituting a continuous bottom with the portion 14 of the trough 7, through which the fuel is forced. Each coal hopper 24 has the inner side walls flared slightly, as shown at 27, 27, opening upwardly into the funnel parts 28, 28, connecting with the coal receiving chute 29. At the forward end of funnel parts 28—28 is a recess, (see Fig. 2) adapted to receive adjustable plates or scrapers, whereby the opening and bearing for the fuel feeding ram may be adjusted. I also prefer to form the ram or piston 25 square or rectangular in cross-section, giving a larger pushing area for the same length of stroke, and by applying an adjustable U-shaped scraper 30, having arms 31 and 32 extending downwardly on each side of the squared ram 25, adjusting this scraper as desired on bolts 33 passing through enlarged slots 34, 34 in the scraper, I substantially prevent the working through of "siftings" by the fuel feeding ram. If desired the sides or arms 31 and 32 may be separate and independently adjustable upon the sides of the ram 25. This feature of eliminating the waste and accumulation of siftings in front of a stoker, is of great importance, as heretofore it has been necessary usually to require attendants who were constantly employed in shovelling up such siftings and returning them to the coal chutes when such prior stokers were working to full capacity. By forming my fuel feeding rams squared the coal hopper constructed to receive adjustable scraper or scrapers therein and having said ram loosely fit the sides of the hopper or trough in which it moves, I secure a very efficient fuel feeding construction, reducing wear and preventing sticking and furthermore, enable such ram to be reciprocated with a minimum of power, such adjustable scraper also enables me to compensate for wear between the ram and its casting by adjusting the scraper from time to time as desired.

The piston casing 24 is provided with a flange 35 which is secured by bolts 36, 36, to a suitable support 37 carrying the bearings 38 of the crankshaft 40, arranged to operate said pistons, connecting rods 41 being suitably pivoted to said crank shaft, between bearings 38, at one end, and with the other end pivoted to the cross-bar 42 in each piston 25, or any other wellknown connection to reciprocate the pistons 25 may be employed.

Formed on the top of each trough and being an integral part thereof is a connecting cover 16, preferably formed hollow to receive a portion of the air supply and keep the same cool, preventing it from burning out. This cover 16 is fitted closely underneath the front wall 2, and I prefer to make the same with a small forward section 16ª removable, and renewable, this being the only portion of this cover 16 which is apt to wear out or burn out, as it is that part exposed to the intense heat of the fires on the stoker. Each cover 16 is preferably shaped as a hollow box having an air receiving inlet 39 and a downwardly directed outlet 39ª, this outlet being formed as a slit or opening between the upper portion of the cover 16 and the removable section 16ª, thus providing a constant current of air through the cover 16 and in front of the removable section 16ª directly into the fuel bed, such fuel bed taking approximately the shape indicated by the dotted line 44 in Fig. 2.

Between each trough and therefore between the adjacent sides 6 forming the trough, and resting on the lugs 8, are positioned my novel type of tuyère boxes, through which the forced draft is supplied into the fuel bed from the large air chamber 45 extending under the entire set of retorts and boxes, such air under pressure being supplied through one or more pipes 46 from any suitable fan or blower having a controlling valve 47 therein and giving a substantially open and therefore uniform air pressure throughout the entire extent of the stoker, the chamber 45, as explained, extending under the entire retorts and boxes, and having tight front walls 48 so that the air pressure from the chamber 45 can only escape through the tuyère boxes between each retort, through the covers 16, outwardly through the clinker pusher, as will be described, and the overfeed grate portion.

This large air chamber with the constant supply of cool air under pressure tends to keep all the parts of my stoker cool and therefore prevents them from burning out too rapidly, or deteriorating. This feature is of very great importance, not only preserving the various parts of the stoker under the fires, but also providing a uniform distribution of air throughout each tuyere box in each retort and all the retorts preventing the air openings from clogging up, insuring an even combustion and resulting in increased efficiency and satisfactory operation of the stoker, as well as eliminating the formation of clinkers and the even removal of the ashes.

In previous makes of underfeed stokers of the inclined grate type using upper fuel feeding rams and lower fuel feeding, clinker moving rams operating in a horizontal direction in a retort, the retort did not get this cooling effect of the forced air as the air was led forward and upward from a transversely placed box trough shallow channels, closed at the bottom between retorts and opening to the tuyeres spanning the retorts, such shallow channel filling up in a short time with siftings which caught afire and often burned out great portions of the retort and grates.

The tuyeres, which are of novel design, possess the very important novel features of being independently removable from the supports 8, in case one is broken, burned out, clogged or warped, and it is necessary to replace the same; also my novel tuyeres are in the form of boxlike structures, with great strength, substantial thickness enabling them to continue in service even when burned largely through, and besides having novel arrangement for distribution of the air therethrough. In addition to the above advantages, I have so formed my tuyere boxes that a substantially smooth exterior surface is presented to the fuel bed and the coal supply, which is forced out of the troughs, flowing upwardly and spreading over the lines of tuyeres. Heretofore the tuyeres used have generally been in the shape of a single plate or plates with grooves or recesses therein, such plates being in the form of steps presenting ridges, which caught clinkers, slags, and the like, and quickly choked up. Besides, being thin plates, they readily warped, became cracked, worn and useless. Furthermore, the use of such thin plates for tuyeres necessitated the interlocking of the tuyeres one to the other, and as each overlapped the other, if the lowermost tuyere plate was burned through, broken, or had to be replaced, it was necessary to take down the entire tier of tuyere plates, beginning with the uppermost, dismantling the whole retort section, to get at the lowermost plate and replace it, whereupon the entire rebuilding of the retort was required. I have eliminated this very objectionable feature by making my tuyere boxes indepedently removable, and as this is a distinct novelty in this art, I wish to claim the same broadly. By having the tuyere boxes supported independently of each other in the tier and resting on the supporting lugs 8 on the retort sides, with a pair of bolts passing through said lugs and easily accessible from the large air space 45 underneath the entire stoker, any tuyere box can be removed and replaced at will, without disturbing the rest of the tuyeres in the rest of the tier. As shown in enlarged detail in Figs. 9, 10, 11 and 12, each tuyere box 50, 50, 50, is made of substantially boxlike form, with a conical outer surface presenting a smooth, and in combination with the adjacent tuyere boxes in the tier, a continuously smooth surface from the topmost tuyere (see Fig. 2), to the lowermost, where the fuel bed extends onto the overfeed grate portion. Such smooth outer surface being inclined along the lines 51, as illustrated at a desired slant for gravity feed and depth of the stoker, being interrupted only by the various air openings designated generally as 52. In Fig. 1 these air openings 52 are omitted for the sake of clearness except in the lowermost tuyeres. Each tuyere box 50 is provided with a plurality of horizontal floors, the upper or topmost one 53, the next lower one being designated as 54, the intermediate floor 55 having a prolongation extending rearwardly of the tuyere box and bar at 56, 56, to rest and be bolted upon the lugs 8, 8, to which the tuyere box may be applied. The lowermost floor 57 is slightly above the partial open bottom 58, which latter rests upon the top floor 53 of the next lowermost tuyere, thus utilizing the same as a floor to provide for the air distribution as will be explained. The rear surface of each tuyere box at each side, is inclined on the same angle as the front line 51 and the same as the retort sides 6, each tuyere box having a flange 60 and shoulder 61 on said angle to afford a rest or bearing on the edges of the retort sides, which, together with the rearwardly projecting floor 55 and the bolts securing said floors to lugs 8, holds the tuyere box in its position in the tier independently of the next lowermost box, although it practically rests upon the next lowermost box as just explained, affording a relatively firm, snug, bracing fit, but nevertheless being independently sustained on the sides of the shoulders sufficiently to enable one tuyere box to be removed and replaced and yet in cooperative sustaining position when a large bed of fuel is on the stoker. The tuyere boxes resting on the sides of adjacent retorts are open underneath to the air chamber 45, so that the air pressure supplied therein flows outwardly through these tuyere boxes and through the open air spaces in the rear of each box along the lines of each floor.

Openings through each inner floor as shown at 62, 62, 62, still further enable an intermingling and diffusion of the air pressure in a uniform manner, so that should one air opening be clogged, a supply of air to the entire fuel bed will not be materially diminished. I prefer to make these air openings 52 throughout the face of the tuyère box of different sizes and preferably in staggered relation, not only staggered vertically, but also horizontally, thus giving a very strong construction to the tuyère box and preventing its being weakened by a pair of openings 52 being diametrically opposite each other. This staggered construction, therefore, gives a tuyère box which has a large mass of metal for strength with practically no weakest point. I also prefer to form the air ports 52 of conical shape to give strength and larger openings than would be possible with straight ports, thus preventing coal, clinkers or the like from sticking therein, or if temporarily lodged in the air passages leading to the ports 52, they can be readily removed. An additional feature of my novel tuyère box consists in the size of the air ports, which open immediately into the relatively large air channels or passages in the floors of each tuyère box, giving a considerable supply, force and direction to the air discharge tending to keep the same clear from choking, either by clinkers, or burning off and melting down of the iron. As shown in Fig. 1, the half-tuyères 63 are provided at each edge of the stoker in much the same manner as ordinary half tuyères, my box construction carrying out this arrangement fully and completely, so as to give a full retort arrangement throughout the stoker. An important advantage in having each tuyère box so formed and independently removable and replaceable without any connections between one tuyère box and the adjacent tuyères in a tier, is that the same can be made interchangeable, and if desired, a tuyère box which is being subject to the heaviest wear and heat can be quickly changed in its position with one remote therefrom, and thus the life and usefulness of the boxes may be considerably prolonged, while any tuyère box will fit any place in the stoker and no order of laying them up is required, either in building or repairing. Furthermore, my tuyère boxes in combination with the relatively large ports 52 and the air chamber 45 provide ample means to permit the supply of natural draft to the fires and the discontinuance of forced draft when such change is desired, as in breaking of the fan and the like. The large air space 45 giving a reservoir or supply of air and the tuyère boxes giving definite lines of draft and large unchecked openings or ports, render such natural draft operation perfectly feasible, whereas small narrow air passages or ports and crooked confined air pipes would prevent the flow of natural draft therethrough.

This construction results in a tuyère that remains operative to successfully perform its function until but approximately 40% remains. Heretofore when the front end of a tuyère burnt away it was necessary to replace it with a new one and such replacement is an expensive operation, not so much perhaps because of the cost of the new tuyère, but because of the cost of labour involved in dismantling the troughs and reassembling them again. In addition, the furnace must of necessity be out of commission during such replacing operation.

In my improved stoker, I have combined with the retorts and underfeed features, an overfeed grate interposed between the underfeed grates and the dumping devices, which overfeed grate is positioned at a sharper angle than the incline on which the tuyères and retorts are built, this arrangement facilitating the feeding of the nearly consumed fuel and ashes which reach this point. Also, by having an incline of approximately 45% for the overfeed grates. I secure a complete gravity feed thereover without the necessity for supplying power in any manner, thus conserving the power necessary to operate the stoker to the fuel feeding ram, the clinker pushing ram and the automatic actuation of the dumping grate. In connection with the overfeed grate, I have a novel arrangement to supply a relatively large mass of air under reduced pressure at this point in the fuel bed, eliminating the mass of iron supporting the fuel and thus preventing dead spaces permitting the formation of clinkers, but on the contrary injecting a large amount of fresh air and oxygen to completely consume the fuel. The web 12 at the rear of each retort has an opening therethrough as shown at 70, Fig. 2, permitting the air from the large chamber 45 to pass therethrough and supply the overfeed grates 71. The damper 72 mounted on a rockshaft 73 controlled by a rod 74 outside the stoker, runs transversely through the webs or legs 9 at the rear of each retort, thus controlling the air passing through all the openings 70 simultaneously. The overfeed grates 71 are of novel formation, comprising a plurality of horizontally extending members 75, spaced from each other at the front ends, and each having a rearwardly and upwardly extending portion 76, all the grates of a section being mounted on supporting bars 77 arranged centrally of each section, each with a depending lug 78 at the upper part to fit in the recess 11 in the brackets 10 already described, and with the lower portion of the bars 77 provided with a recess 79 to fit over the upstanding rim of a plate 80 secured to a channel beam 81 resting on the foundation and affording a firm support for the rearmost portion of the overfeed grates. Each grate section may be lifted out and removed freely and independently of the others, and they are interchangeable. The grate members 75 with the rearward overlapping portions 76, are formed to provide air passages therethrough in the form of an inverted nozzle, that is, a nozzle in which the inlet orifice is less in cross-sectional area than the outlet orifice therby reducing the force or pressure of the air when supplied under forced draft at this particular point in the fuel bed, giving a relatively large volume of air with a correspondingly large proportion of oxygen specially adapted to completely consume the remaining fuel passing over the overfeed grates. This feature is most important in practice and is one of the novel improvements in my stoker which effectually aids in eliminating clinkers and providing for a complete combustion of fuel. While I have shown and described this feature as being applied to an automatic stoker, it is evident that its use is not thus limited, and it is adapted to be used with any furnace in which forced draft is utilized. The last set of four or five grates, as designated at 82, may be and preferably are, formed vertically, permitting the air to pass through the last mass of matter at the dump grates and effect a combustion thereof. One of the important features of my overfeed grate construction, whereby a relatively large amount of air supply is given to the fuel at this point in the stoker, results from the extending and upwardly overlapping portion 76 of these grate bars, which thereby prevent ashes or siftings from working backwardly through the spaced grate bars 75, and permit a relatively large spacing of said bars. This arrangement similarly affects the inverse nozzle feature on the forced air as above explained.

My arrangement of dumping sections, which are preferably operated automatically and continuously, although they may be freely actuated by hand or disconnected from the automatic actuation, consists in very simple and efficient devices.

The grate bars are in sections preferably in alinement with the section 71 of the overfeed grates, and are mounted on the shaft 85, which shaft is secured in suitable bearings 86 at a plurality of points transversely of the stoker by brackets 87 having flanges 88, bolted to the channel beam 81 and support 80. Each dump grate section is preferably mounted on a supporting web 90, which has a slightly offset portion or hub 90ᵃ secured to the shaft 85, giving an upper surface to the supporting web 90 which will move eccentrically with the rocking of the shaft 85. As the webs 90 and the grates thereon extend at one side of the shaft 85, I apply a hanger 91 keyed to each end of the shaft 85 and connect said hangers by a rod 92, on which rod are many counterbalancing weights, in order to effectively counterbalancing the weight and action of the dumping sections, and thus render the oscillation of the shaft 85 relatively easy, and requiring but a small amount of power. The grate sections 95 are adapted to "straddle" each support 90, a pair of depending lugs 96, 96, extending downwardly on the underneath side of the grates to engage the supporting webs 90, and be secured thereto by a cotter pin or bolt 97. I prefer to form these dumping sections 95 with a plurality of teeth running horizontally and designated at 98, said teeth having slanting upper surfaces and relatively perpendicular lower faces 99, which facilitate the feeding action on the refuse resting on these dump grates as the shaft 85 is rocked, because of the formation of these teeth and the eccentric movement of the dumping section toward the extreme rear or discharge point 100 at the end of the dump bars, which point is preferably reenforced by an extra heavy bar so as to prevent undue wear at this point and furthermore enable the rocking of the dump sections to crush, pulverize, and loosen the ashes between the dump sections and the bridge wall of the stoker, which will be adjacent the rearmost portion 100 of the dump sections. The shaft 85 extends outwardly (see Fig. 1) and in its outer surface is provided with a socket 101 to receive a lever for manual dumping of the grates and also is fitted with a short crank 102 engaged by one of a plurality of slots in the underneath face of the rod 103, connected with the driving mechanism for the stoker so that the shaft 85 may be oscillated, and the positions of said grates during oscillation may be adjusted by fitting the crank 102 in a selective one of said plurality of slots, so that the dump grates may be adjusted in a more or less vertical position at the start of its oscillation, thereby adjusting the entire stoker to the discharge of ashes proportionate to the feeding in and consumption of the fuel.

The operation and function of the fuel feeding ram 25 has been briefly described, and I prefer to utilize a fuel and clinker feeding pusher to produce a further feeding action of the fuel and partially consumed fuel in the retorts and over the tuyère boxes near the junction of said tuyère boxes with the overfeed grates. This clinker pusher also I provide with means to permit air circulation therethrough to keep the same cool and preserve the metal to prevent said pusher from sticking in its bearing and also to provide increased oxygen and air at the lower portions of the retorts. This feature is of very great importance in that it reduces the power needed for driving and eliminates serious breaks which in previous makes of stokers of this type has been a constant annoyance and expense. This improved pusher also is capable of discharging air at a plurality of points rearwardly into the fuel contained in the retorts or troughs, between air channels bridged with tuyères or what is termed under grate sections, substantially forming an overfeed grate interposed between underfeed grate sections, movable in fuel troughs. This means of adding extra overfeed grate surfaces in between underfeed grate surfaces is beneficial in that jets of oxygen are injected into the coke and partly consumed fuel bridging the retort from one row of tuyères to the other; such jets of oxygen penetrate and in conjunction with the reciprocable movement of the pusher help to break up and loosen and further consume the coke, thus preventing to a great extent the loss of this coke from being dumped out among the ashes. The clinker piston or pusher 105 is preferably square and arranged to reciprocate in an air opening 18, already described in the framework of retorts, resting between the floor portion 19 and the lower floor 15, said pusher being hollow at its rearmost end to receive air supply from the chamber 45. Attached to the pusher 105 is a member 106, consisting in a continuation of said pusher and having its front surfaces formed in a series of steps as indicated at 107. This arrangement affords a positive pushing action on the vertical face of each of the steps and the series of steps give a general line of inclination nearly parallel with the outer line 44 of the fuel, thus effecting an upper forward and feeding action of the fuel, clinkers, etc., in the lower part of the retort. Air passages 108 between the members 105 and 106, afford air circulation between the interior 109 of the pusher 105 and the interior 110 of the member 106. I prefer to supply a still further forward section to this clinker pushing device, consisting in the slide 112, which is substantially a movable overfeed grate, sliding between fixed tuyères, and is connected to the member 106 and with air openings 113 to provide continuous air supply through all three sections of this clinker pusher and overfeed grate. The extreme forward part of the slide 112 is a relatively heavy plate 114 arranged to slide over a removable cover 115, which latter extends entirely to the beginning of the overfeed grate 71, having an extending downward portion 116 engaging the recess 22 in the support. This construction enables the plate 115 to be raised and the overfeed grate section 71 removed or permits the entire removal of the plate when the clinker pusher is in retracted position. The provision for circulation of air through the entire series or sets of devices constituting this clinker pusher and movable overfeed grate, leads a considerable amount of fresh air into the extreme rearward and lowermost portions of the retorts, which stimulates combustion, and also serves to preserve and keep this fuel pusher cool, thereby preventing its swelling and sticking in the bearings over which it slides, as well as saving power to actuate it. The clinker pusher is reciprocated by a rod 118, pivoted to a crossbar 119 in the piston 105, and sliding through a bearing 120 affixed to the channel section 3, adjacent a perforation therein, through which the rod 118 moves.

It may be desirable, and I contemplate the construction whereby the entire clinker pusher and its adjacent bearings and parts constituting the lowermost portion or bottom of each retort, may be inclined to give a still further gravity feed, which inclination would be preferably at the same angle as the inclined portion 14 in the fuel feeding part of each retort 7. Such inclined construction as illustrated in Fig. 3, which is identical with the construction just described on Fig. 2, a flexible connection in the rod 118 being all that is necessary to operate the clinker pushing device in inclined position.

In my automatic stoker I prefer to have independent actuating devices for the fuel feeding ram and for the clinker pusher in each retort, although preferably utilizing the same actuating power to operate all the fuel feeding rams from the same power shaft, and all the clinker rams from a separate power shaft, alternating the power stroke in adjacent retorts. Thus the fuel feeding ram in one retort will be moving to force the fuel into the trough 7 while the adjacent fuel feeding ram in the next retort will be moving reversely or backwardly, thus saving power, while connecting all the rams on the same crank shaft, so as to operate in timed relation. The clinker pusher in each retort is preferably reciprocated at a much slower speed than the fuel feeding ram, and entirely independently thereof, although capable of movement in any timed relation with the fuel feeding ram which may be requisite for the proper operation of the stoker. Independently adjustable devices to vary the amount of movement or reciprocation of the rams and clinker pushers in each retort are provided. Novel arrangement for actuating these respective rams and pushers by means including a novel type of shearing pin construction to prevent damage or breakage to the parts in case of obstruction are also provided, and such driving means will now be explained. As shown best in Figs. 2, 13, 14 and 15, the driving mechanism to impart reciprocating movement to the fuel feeding ram and the clinker pusher include a pawl and ratchet drive for each shaft, the driving means for the fuel feeding ram consisting in a ratchet wheel 121 secured to the crank shaft 40, and a similar ratchet wheel 122 on the shaft 123 imparts power to the clinker pushers, preferably through eccentrics 219 and a strap 119ª thereon connected with the rod 118 to each pusher. I prefer to employ the same method of rotating these geared wheels 121 and 122, and therefore a description of one will suffice for both. As illustrated in Figs. 13, 14 and 15, showing the driving attachment for the ratchet wheel 121 on the shaft 40 at a point adjacent the wheel 121, is mounted a gear box 124 having a worm and gear 125 and 126 receiving power through a chain 127 from a sprocket wheel 128 mounted on a power shaft 130, which latter is rotated from a source of power. A similar gear box 131, sprocket wheel 132 and sprocket chain 133 transmit power from said shaft 130 to the driving means operating the ratchet 122 for the clinker pushers. The worm wheel 126 within its gear box is mounted on a shaft 135, which latter runs in suitable bearings 136, 137, within said gear box, and is secured by a key 138 to an eccentric 140. A strap 141 encircling said eccentric has an upwardly extending arm 142 to which vertical movement is imparted by rotation of the shaft 135 and eccentric 140. The upper part of this arm is provided with a plurality of holes 143 into a selective one of which is fitted a rod 144 adapted to raise and lift a sliding block 145. Near the upper end of the arm 142 is a recess to receive a steel bushing 146 in which is fitted a shearing pin 147, which latter pin extends either side of the arm and engages a similar steel half-round bushing 148 carried by the sliding block 145 to force said block to move downwardly. This block has a central aperture slightly flared, as shown in dotted lines in Fig. 15, at 149 to permit the rocking action of the arm 142 and its eccentric edgeways of the said arm, while affording a close sliding fit to said arm in the crosswise direction where the shearing pin 147 projects and rests on the bushing 148. This sliding block 145 is provided with a pair of vertical lugs 150, 151, at opposite sides mounted to slide in slideways 152 and 153 respectively formed in posts 154 and 155 extending upwardly from the gear box 124. A sliding block 145 also is provided with a pair of lugs 156 and 156 extending forwardly a sufficient distance to straddle the ratchet wheel 121 and supports a pawl 157 on a pin 158 extending between the lugs and constituting a pivotal bearing for said pawl. This pawl 157 has its points shaped to engage the teeth on the ratchet wheel 121 and is normally held in engagement therewith by a spring 160.

The operation of this driving device will be readily understood on reference to the enlarged detailed drawings, Figs. 13, 14 and 15. Power being applied to the worm wheel 126 and rotation of the shaft and eccentric carried thereby, effects a reciprocating movement in the arm 142, which freely slides through the recess therefor in the center of the block 145, until the pin 144 strikes said block in the upward movement of the arm, thereby raising said block and allowing the pawl 157 to be lifted a distance sufficient to engage one or more teeth on the ratchet wheel 121, depending on the height to which said block is lifted, and secondly depending upon which one of the holes 143 said rod 144 may be fitted into. This arrangement provides for a considerable range of adjustment, the entire removal of the rod 144 effecting the stoppage of the driving mechanism and the positioning of said rod in a recess providing for the speed of rotation within the range of one tooth or three teeth of the ratchet wheel 121 for each vertical reciprocation of the arm 142. This particular feature of starting and stopping a stoker by simply inserting and withdrawing the lifting pin 144 in my driving gear is of great advantage, and one which I want to claim broadly, as it enables me to dispose of clutches, brackets, levers, sprocket-wheel bushings or bearings and the like; all wearable and expensive parts which require much attention and repairs, and which are universally employed on the primary driving shaft on any prior stoker of the type described. The sliding block 145 having been lifted upwardly during the upstroke of the eccentric and arm 142, the shearing pin 147 constitutes the driving connection between the arm and the sliding block, producing a partial rotation of the ratchet wheel 121, depending on the height to which said block has been lifted by the rod 144 as just explained. This is the power stroke of the apparatus and moves the crank shaft 40 producing a reciprocation of the fuel feeding rams. In case of any obstruction preventing the proper operation of the stoker, the shearing pin 147 is of suitable size and temper to break before any of the rest of the mechanism will become damaged or injured. By providing the steel bushing 146 holding the shearing pin in the arm 142 and the cooperating half steel bushing 148 in the sliding block, a clear shearing cut is insured, and a new pin 147 can be easily and instantly applied. Furthermore, this safety factor is in plain view, so that the attendant can see and correct the same at once, without loss of time or danger of damage to the mechanism.

In Fig. 16 I have illustrated a modification wherein the arm 142 is pivotally attached to a sliding member 170 by a bolt 171, the lifting pin 144 being placed through any one of the holes 143, to lift the cooperating sliding block 172, preferably constituting one half the sliding members in a similar set of guideways to that illustrated at 152 and 153 and already described, and operating the pawl and ratchet to drive the ram crank and clinker pusher shaft. In this construction the shearing is effected by the breaking of the shearing pin passing through the bored recess 174 in the block 170 and engaging the steel half bushing 175 in said block 172. Other modifications will readily occur to those skilled in the art.

The operation of my stoker will be understood from the foregoing description and the facility with which the entire stoker may be installed will also be appreciated as an important feature. The fitting of the retorts or troughs in proper spacing and alinement, simultaneously provides for the positioning, alinement and attachment of the various sets of tuyère boxes which may be applied in any way that may be convenient—not necessarily beginning with the lowermost tuyère when in building up the tier, but in reverse order if feasible. The alinement for the clinker pusher and piston is also thus determined, as well as for the fuel pushing rams, the latter and the hopper being separately installed and attached outside the front wall 2 and after the inner parts of the stoker have been built and fitted. The arrangement of the gear boxes and driving mechanisms, both for the crank shaft 40 driving the fuel feeding rams and for the driving connections for the clinker pushers. These driving connections have been shown in the drawings as one only for each shaft, but it will be realized that an important advantage of my stoker consists in the capability of installing a plurality of such driving pawl and ratchet connections across the front of the stocker, depending on the size and power required. Each driving connection would be independent of the other or could be geared to work in unison. With the various parts of the stoker installed in position, and the tuyère boxes fitted, the scraper 30 is adjusted about the top and sides of the fuel feeding ram to prevent siftings from working backwardly and to aid in holding this ram in its position, this being one of the advantages of having the same squared in cross-section, as well, also, as the further advantage of enabling a larger mass of fuel to be fed forwardly, for the same length of stroke, with a square ram, than with round faced ram—as prior stokers used—for the same sized shaft. Power being supplied to driving connections, and the shearing pins fitted, the mechanism is ready to operate and will become self-feeding upon application of the lifting rods 144. If it is desired to give a slow feed, proportioned to the speed of rotation of the sprocket wheel, and therefore to afford great power, the rod 144 is fed through the lowermost hole 143 in the lifting arm 142 in each driving gear, which will thereupon only raise the sliding 145 the distance of one tooth on the adjacent ratchet. If a relatively fast feed is desired, the rod 144 is fitted through the topmost hole 143, thereby lifting the pawl and slide three teeth, and consequently rotating the ratchet a greater distance with each reciprocation of the arm. Separate adjustments for the fuel feeding rams and for the clinker pushers are, of course, made. Fuel being supplied, the same is rapidly pushed into the trough 7, and flows upwardly and outwardly over the tuyère boxes adjacent each retort, a kindling fire being first built on the stoker and forced draft under proper pressure admitted in the chamber 45, the coal soon piling up to a considerable extent, determined on the kind and quality of fuel and the speed of feeding. I prefer to have the clinker pusher move at a much slower rate, as well as a somewhat less distance, compared with that of the fuel feeding ram. This pusher, with the inclined steps or faces 107 imparting an upward and outward lifting and feeding action, to the mass of fuel in the lower portions of the retort. The constant supply of cool air under pressure underneath and around the sides of each retort through the cap or cover 16, as well as through the clinker pusher devices, keeps the same cool, preserves them from burning out, prevents swelling and consequently eliminates sticking in the clinker pusher and reduces the power required to actuate same. After the coal is burning, and as it reaches the overfeed grate 71, the damper 72 is set so as to supply a sufficient amount of the forced draft through the opening 70 and into and through the overfeed grates, the pressure being automatically reduced as the air passes through said grates owing to the inverse nozzle arrangement already described. Meanwhile, in order to operate the dumping grates automatically, the rod 103 may be set on the lever 102, securing an automatic rocking and consequently a feeding and dumping action on the ashes deposited thereon. I prefer to have the rod 103 actuated in timed relation with the clinker pushers and therefore connecting the bar 103 by its eccentric strap 180 on an eccentric (not shown) keyed to the outer end of the shaft 123 actuating the clinker pushers. This arrangement permits the dumping grates to be set for any degree of opening between the rearmost portion 100 and the line of the bridge wall 181 as indicated approximately in Fig. 2. Should any obstruction be encountered, the shearing pins will break evenly and cleanly, without jamming, locking or catching in the driving mechanism, and being right in view, will be quickly attended to by the operators. The air flowing into, through and out of the tuyère boxes through comparatively large openings and in considerable quantity, tends to keep the same clear and maintain combustion at a uniform rate throughout the entire stoker. Should any siftings work back into the tuyère boxes, they will be caught and held in the various floors of each tuyère box and prevented from all working downwardly into the bottom, choking up the lowermost air passages and creating "dead spots" in the fires. By having the overfeed grate sections at a steeper inclination than the line of the retorts and tuyère boxes, I secure a positive feeding of the clinkers, ashes and consuming fuel directly onto the dumping sections as rapidly as desired without the necessity of moving, reciprocating and oscillating the overfeed section of my stoker, while the large air spaces therein afford means to complete the burning of all remaining combustible material in the fuel at this point. In case it is desired to employ the slanting retort bottom throughout its entire length, as shown in Fig. 3, the feeding of the fuel is still further facilitated by this increased provision for gravity feed. The tuyère boxes being substantial structures and supported at the extreme end and rearmost parts resting on the retort edges, may be used until they are almost burned entire through before seriously interfering with the operation of the stoker, and being of boxlike form, do not warp, while the staggered arrangement of the openings prevent cracks and breaks therein. When it is desired to remove a worn tuyère box and replace the same with a new one, access to the bolts or pins connecting each tuyère box to the lugs 8 on the retort sides can be reached through the large air chamber 45, knocking out said pins and withdrawing the entire tuyère box from its position, replacing it with a new one without disturbing the other tuyère boxes in the tier above or below. Should it be necessary at any time to replace or renew the bearings or ram for the fuel feeding portion, this can be quickly removed from the outside of the front wall 2 without disarranging the tuyère boxes or retorts, and similarly the overfeed grates may be renewed by a lifting of the pivoted cover 115, removing the overfeed grate section, and replacing it with a new one, without taking out bolts, displacing the tuyères or retorts, while the dump sections on each support 90 may also be as quickly removed and replaced when worn. The dump grates may be connected by a rod 182 passing through alined holes in each support 90, distributing the strain throughout all the supports 90, should a clinker become wedged between the grate and bridge wall, and require crushing or dislodgement. Such a rod also serves to keep the dump sections in the same plane during their oscillation. It will be seen that my automatic stoker provides a more readily accessible and renewable mechanism than any other of which I am aware, and furthermore maintains all parts subject to heat and damage under the cooling influence of the forced air draft to preserve them and prolong their usefulness.

My invention is further described and defined in the form of claims as follows:

1. In an automatic underfeed stoker, having upper and lower fuel feeding means, means to operate said lower fuel feeding means independently of said upper fuel feeding means, and in timed relation therewith.

2. An automatic stoker of the kind described, having fuel retorts, a plurality of fuel supply feeding devices, a plurality of fuel feeding and clinker pushing devices movable in said fuel retorts, and separate actuating means for said devices for operating the same in timed relation with each other.

3. An underfeed stoker furnace of the kind described having the grate surface at an angle to effect a gravity feed of the fuel, comprising fuel supply feeding means, clinker moving means, and adjustable mechanism to actuate each of said means independently of each other in timed relation.

4. In an underfeed stoker furnace, retorts having sloping mouths and spaced apart to form air channels therebetween, the sides of said retorts being flared towards said air channels, means to feed fuel to said retorts, a pusher and overfeed grate in each retort, and means to operate said pusher and overfeed grate in each retort separately and independently from the means to feed fuel to said retorts and in timed relation therewith.

5. In an automatic stoker, fuel receiving troughs, underfeed grate sections upper fuel feeding rams, a set of lower fuel feeding and clinker moving rams, comprising overfeed grate sections, said overfeed grate sections alternating with said underfeed grate sections and movable in the fuel receiving troughs, a power shaft independent of the upper fuel feeding rams, and eccentrics, mounted on said shaft to transmit power therefrom to reciprocate the overfeed grate sections in the fuel receiving trough, whereby a slow continuous movement is given to said overfeed grate sections or rams.

6. The combination in an underfeed stoker furnace, of a retort, a pusher to feed fuel to said retort, a pusher reciprocable in the retort, and means to give said pusher in the retort a predetermined greater or lesser number of reciprocations in a given length of time than the pusher to feed fuel to said retort.

7. The combination in an underfeed stoker furnace, of a retort, a pusher to feed fuel to said retort, a pusher movable in the retort, means to relatively vary the number of strokes of said pusher in the retort, from the pusher to feed fuel to said retort.

8. In a furnace of the kind described, comprising fuel supply feeding means, fuel receiving troughs, fuel and clinker feeding means movable therein, and means to automatically alter the number of movements of said fuel and clinker feeding means without altering or interfering with movements of the fuel supply feeding means.

9. The combination in an underfeed stoker furnace, of a fuel supply feeding ram, a fuel receiving trough, a fuel and clinker feeding ram reciprocable therein, said fuel and clinker feeding ram being in direct contact with air under pressure and provided with a passage for conducting the air from the forward end thereof through said ram and into the fuel bed.

10. In an underfeed stoker furnace, a fuel and clinker feeding ram reciprocable therein, said ram being provided with an air passage and having a forward end portion in contact with air under pressure flowing outward through the ram and into the fuel bed, whereby the ram is kept cool during use.

11. In a furnace, a fuel receiving trough, a hollow fuel and clinker feeding ram reciprocable therein, means for creating air pressure in front of the forward end of said ram, a passage in said ram for conducting the air under pressure therethrough and discharging the same into the fuel contained in the trough.

12. In a furnace of the kind described, fuel receiving troughs, a fuel and clinker feeding ram for each trough and reciprocable therein, an air chamber containing air under pressure underlying all of said fuel receiving troughs, and means in said rams for conducting the air therethrough from the forward end thereof and into the fuel bed, whereby each ram and its bearing are kept cool during use.

13. In an automatic stoker of the kind described, a retort, a ram movable over the retort bottom adapted to receive and to discharge air, and means to regulate the pressure of the air flowing through said ram.

14. In a stoker of the kind described, fuel receiving troughs, a fuel and clinker moving ram reciprocally mounted in each trough, each ram comprising a pusher section having its fuel engaging surface formed as a plurality of steps in general parallelism with the normal top surface of the fuel bed, each ram and pusher section having means for air circulation therethrough and to discharge the air at a plurality of points into the fuel contained in said troughs.

15. In an automatic underfeed stoker, having upper and lower fuel and clinker moving means, a fuel retort having the sides at the receiving end substantially flared to prevent the coal from cramping when in the process of feeding, said flared sides being bridged at the top to form a hollow cover having means to receive and discharge air under pressure downwardly into the fuel bed.

16. In an automatic underfeed stoker, overfeed grate sections, a fuel receiving trough having flared sides and with the rearward portion of the bottom of said trough made detachable, and provided with a pair of legs, said trough being supported on said pair of legs at the lower end and having a rearwardly extending bracket forming a support for said overfeed grate sections.

17. In an automatic underfeed stoker, a hopper to receive a fuel supply, a reciprocable ram in said hopper, and adjustable means in the hopper to compensate for wear and to prevent siftings around said ram.

18. In an underfeed stoker furnace, a fuel retort downwardly inclined towards the rear, sides flared to prevent cramping of the fuel, and being bridged at the top to form a hollow cover, a renewable member at the lower and rearward end of said cover, and means to direct air through and from said cover and renewable member downwardly into the fuel bed.

19. In an underfeed stoker furnace of the kind described, retorts spaced apart to form air channels therebetween, each retort having a plurality of detachable members forming the bottom thereof, the sides of said retorts being flared toward said air channels, a hollow casting bridging the sides at the top at the receiving end, said hollow casting being an integral part of each retort and having means to receive and to discharge air downwardly into the fuel bed; said fuel retort being sustained in position by a support at the lower and rearmost end thereof, overfeed grates, and means on said support to sustain the overfeed grates in position.

20. In a furnace, fuel receiving troughs spaced apart to form air channels therebetween, each fuel receiving trough having a plurality of detachable and renewable bottom plates, sides flared towards said air channels, a cover at the receiving end connecting the sides and being an integral part thereof, said cover having a renewable member attached thereto, overfeed grates and each trough supported in the rear by a web and having a rearwardly extending bracket forming a support for the overfeed grates.

21. In a furnace, an inclined fuel receiving trough, a hopper, each fuel receiving trough communicating at its upper and forward end with said hopper, air channels on each side of and extending longitudinally of the trough, said fuel receiving trough having a rearwardly sloping mouth, sides flared upwardly and rearwardly towards said air-channels, an opening in the bottom of the trough, a pusher adapted to pass therethrough, said trough having a rearward portion of the bottom made detachable, and a further rearward portion made renewable from said detachable portion, said trough having its sides bridged at the upper and forward end and being supported at the lower end by a pair of upright walls, said walls forming supports for overfeed grates.

22. The combination with an automatic stoker having underfeed grate portions, of a stationary overfeed grate positioned at the lower and rearmost end of the underfeed grate portions, said overfeed grate comprising a plurality of independently removable sections having air passages therethrough formed to automatically effect a discharge of air under less pressure and of correspondingly increased volume, than the air immediately under the grates, said overfeed grates communicating with a separate air chamber fitted with adjustable dampers.

23. The combination with an automatic underfeed stoker, of an overfeed grate having a plurality of air passages, each of said air passages being of lesser cross-sectional area at the receiving end than at the discharging end, forming thereby an inverted expansion nozzle, whereby the fuel will be supplied with air of greater volume and under decreased pressure in relation to the air immediately under the said grate.

24. In an underfeed stoker furnace, air discharging tuyères, a fuel retort bridged at the receiving end, said bridge being an integral part thereof and having a renewable member attached thereto, a plurality of outwardly extending brackets from the sides of said retort, cooperating with adjacent air discharging tuyères and forming supports therefor.

25. In an underfeed stoker furnace, a fuel retort having means therein to discharge air downwardly into the fuel bed, overfeed grates, a plurality of brackets extending from the outer face of said retort into adjacent air channels, a hinged member attached to the bottom of said retort adapted to be lifted, whereby the underlying overfeed grates may be independently removed and renewed without dismantling any adjacent overfeed grates or stoker parts.

26. In an underfeed stoker furnace, air discharging means, overfeed grates, a fuel retort having a plurality of outwardly extending lugs in engagement with said air discharging means, a member attached to a rearward portion of the retort adapted to be readily moved out of place, whereby the overfeed grates can be removed and renewed without dismantling or disconnecting any adjacent grate members or stoker parts.

27. A fuel retort adapted for use in underfeed stokers, air discharging tuyères, a plurality of overfeed grates, means in the stoker to support the overfeed grates independent of each other, and having a plurality of lugs extending outwardly from the sides of said fuel retort adapted to be in engagement with the air discharging tuyères, and to which said tuyères may be fastened.

28. A tuyère box for underfeed stokers, consisting in a plurality of sections, each section having diametrically staggered air ports, a strengthening floor therethrough, and diffusion openings through said floor.

29. A tuyère box for underfeed stokers, consisting in a plurality of sections having strengthening floors therethrough, diffusion ports through the floors, and horizontally and vertically staggered and disalined openings in the fuel supporting surface of said tuyère box.

30. A tuyère for underfeed stokers, consisting in a section, a strengthening floor therethrough, diffusion ports through the floor, and a plurality of longitudinally disalined and curved air passages through the fuel supporting surface of said tuyère.

31. A tuyère box for underfeed stokers, consisting in a fuel supporting surface, a plurality of vertically and diametrically staggered and disalined openings through said surface, and floors on different horizontal planes.

32. The combination in an underfeed stoker furnace, of fuel receiving troughs spaced apart to form air channels at the sides, and a tuyère spanning the air channels having a plurality of horizontally extending strengthening floors, one or more of said floors adapted to be in engagement with and supported on cooperating brackets in said air channels.

33. In an automatic stoker of the kind described, a fuel receiving trough, having its sides at the fuel receiving end bridged at the top to form a hollow cover, a detachable member at the lower end of said cover, and means to admit air through said cover and from the detachable member discharging the air downwardly into the fuel.

34. The combination with an underfeed stoker furnace, of an overfeed grate positioned under and at the rear of fuel retorts, consisting in a pair of rearwardly vertical and forwardly and upwardly slanting walls, a plurality of shelves interposed between said walls, such shelves arranged in stepped succession at the upper and forward end and in vertical succession at the lower and rearward end, said shelves having their inner edges turned up to prevent siftings working through to the underlying air chamber, and to decrease the inlet opening, thereby forming an expansion chamber between the shelves, whereby the air pressure will be automatically reduced to a predetermined amount in relation to the air in the chamber underlying the grates, to more accurately supply the air in quantities and pressures consistent with the varying thickness of the fuel bed.

35. The combination in an underfeed stoker furnace of underfeed portions, an overfeed grate having a forward and a rearward portion with air channels therethrough, and positioned at the rear of the underfeed portions, said overfeed grates having the forward portion of its fuel engaging surface inclined toward the rear and the rearward portion substantially perpendicular, air openings through said rearward portion, said forward portion having air openings therethrough of greater cross-sectional area than the openings through said rearward portion.

36. In a furnace, a fuel retort, a movable ram positioned and arranged for clinker feeding within said retort, means to supply air under pressure, and means to conduct said air around the forward surface of the clinker feeding ram, whereby the said ram and its bearings are maintained relatively cool.

37. In an underfeed stoker furnace, a fuel receiving trough, a hollow fuel and clinker feeding ram, movable inside said trough, means for supplying air under pressure in front of the forward end of the ram.

38. In an underfeed stoker furnace, a retort, a fuel and clinker feeding ram formed substantially hollow, bearings in said retort for said ram permitting reciprocation, means for supplying air under pressure to the forward end of the ram and about the hollow portion, whereby said ram and bearings are maintained relatively cool during operation.

39. In an underfeed stoker furnace, a plurality of fuel receiving troughs, a plurality of fuel and clinker feeding rams adapted for movement in bearings in said troughs, and a source of air supply under pressure opening into the forward surfaces of all said rams from one chamber.

40. The combination in automatic stoker driving mechanism, of a plurality of reciprocable pushers, a pawl and ratchet driving mechanism operatively connected to said plurality of pushers through a single fracturable pin.

41. The combination in automatic stoker driving mechanism, of a ratchet wheel, a plurality of pushers driven from said ratchet wheel, guideways, a crosshead movable in said guideways, a pawl carried by the crosshead, a member actuating said crosshead and connecting means between said member and said crosshead adapted to collapse under excessive strain.

42. Driving mechanism for automatic stokers, consisting in a ratchet wheel, a plurality of pushers operatively connected to said ratchet wheel, guideways, a crosshead in the guideways, a pawl connected to the crosshead, adjustable driving means for said pawl and crosshead, and collapsible means between said driving means and said crosshead to effect a stopping of the crosshead and pushers under excessive strain.

43. Driving mechanism for automatic stokers, consisting in a ratchet wheel, a plurality of pushers operatively attached to the ratchet wheel, a crosshead carrying a pawl adapted to engage said ratchet wheel, a power worm, a worm wheel, a shaft through said worm wheel, an eccentric mounted on said shaft, reciprocable means slidably attached to said crosshead having adjustable devices therein to vary the amount of movement of said crosshead and pawl in relation to said reciprocable means and a shearing pin in said reciprocable means to automatically effect a stopping of the crosshead, pawl and ratchet wheel when subjected to abnormal strain.

44. Driving mechanism for automatic stokers, comprising a plurality of reciprocally operated plungers, pawl and ratchet connections therefor comprising a guideway, a crosshead adapted to stand torsional strain slidable in said guideway, a pawl connected to said crosshead, an eccentrically operable members slidably attached to said crosshead, and adjustable connecting means between the crosshead and said member whereby the amount of movement of said crosshead and pawl may be varied in relation to said member.

In testimony whereof, I have signed my name to this specification, in the presence of two subscribing witnesses.

OSCAR O. NYGAARD.

Witnesses:
 JAMES R. HODDER,
 ERNEST BERNITZ.